United States Patent
Wigren et al.

(10) Patent No.: US 9,055,500 B2
(45) Date of Patent: Jun. 9, 2015

(54) LOAD ESTIMATION IN SOFTER HANDOVER

(75) Inventors: Torbjörn Wigren, Uppsala (SE); Patrik Karlsson, Stockholm (SE); Markus Ringström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 165 days.

(21) Appl. No.: 13/695,317

(22) PCT Filed: May 18, 2010

(86) PCT No.: PCT/SE2010/050534
§ 371 (c)(1),
(2), (4) Date: Oct. 30, 2012

(87) PCT Pub. No.: WO2011/145986
PCT Pub. Date: Nov. 24, 2011

(65) Prior Publication Data
US 2013/0044601 A1 Feb. 21, 2013

(51) Int. Cl.
H04W 28/08 (2009.01)
H04W 36/22 (2009.01)
H04W 36/18 (2009.01)
H04B 1/10 (2006.01)
(Continued)

(52) U.S. Cl.
CPC ............... *H04W 36/18* (2013.01); *H04B 1/10* (2013.01); *H04W 24/00* (2013.01); *H04W 28/08* (2013.01); *H04W 88/08* (2013.01)

(58) Field of Classification Search
None
See application file for complete search history.

(56) References Cited

U.S. PATENT DOCUMENTS 5,734,646 A * 3/1998 I et al. .............................. 370/335
7,852,902 B2 * 12/2010 Reial et al. ..................... 375/130
8,554,234 B2 * 10/2013 Polini et al. ................... 455/446
(Continued)

FOREIGN PATENT DOCUMENTS

WO 2006075951 A1 7/2006
WO 2006076969 A1 7/2006
(Continued)

OTHER PUBLICATIONS

Chang, J.W. et al. "Admission Control Scheme for Soft Handoff in DS-CDMA Cellular Systems Supporting Voice and Stream-Type Data Services." IEEE Transactions on Vehicular Technology, pp. 1445-1459, vol. 51, No. 6, Nov. 2002.
(Continued)

*Primary Examiner* — Hassan Kizou
*Assistant Examiner* — Tejis Daya
(74) *Attorney, Agent, or Firm* — Murphy, Bilak & Homiller, PLLC

(57) ABSTRACT

Method and arrangement in a Radio Base Station RBS in a wireless communication system, for handling load coupling in softer handover. The method in an RBS involves receiving (702) signals from a plurality of UEs connected to the RBS, using a category 1 receiver. Further, the load experienced by the respective UEs is determined (704). The effect of load coupling in softer handover of at least one of the UEs connected to the RBS is estimated (706), and, when the estimated effect of load coupling of a UE fulfills a predefined criterion (708:1), at least one entity in the RBS is modified (710), such that the effect of load coupling is reduced or avoided.

15 Claims, 6 Drawing Sheets

(51) Int. Cl.
*H04W 24/00* (2009.01)
*H04W 88/08* (2009.01)

(56) References Cited

U.S. PATENT DOCUMENTS

| | | | |
|---|---|---|---|
| 2005/0201447 A1* | 9/2005 | Cairns et al. | 375/148 |
| 2006/0159016 A1* | 7/2006 | Sagfors et al. | 370/230 |
| 2009/0176455 A1* | 7/2009 | Wigren et al. | 455/67.13 |
| 2012/0082195 A1* | 4/2012 | Wigren | 375/220 |
| 2012/0087275 A1* | 4/2012 | Zhang et al. | 370/253 |
| 2012/0163420 A1* | 6/2012 | Persson et al. | 375/144 |
| 2012/0213092 A1* | 8/2012 | Sun et al. | 370/248 |
| 2012/0243594 A1* | 9/2012 | Wigren | 375/227 |
| 2013/0039184 A1* | 2/2013 | Wigren | 370/235 |

FOREIGN PATENT DOCUMENTS

| | | |
|---|---|---|
| WO | 2007024166 A1 | 3/2007 |
| WO | 2007026054 A1 | 3/2007 |
| WO | 2008097145 A1 | 8/2008 |

OTHER PUBLICATIONS

Cozzo, C. et al. "Capacity Improvement with Interference Cancellation in the WCDMA Enhanced Uplink." The 17th Annual IEEE International Symposium on Personal, Indoor and Mobile Radio Communications (PIMRC'06), pp. 1-5, Sep. 11-14, 2006.

Zhang, D. et al. "HSUPA Scheduling Algorithms Utilizing RoT Measurements and Interference Cancellations." IEEE ICC 2008, pp. 5033-5037, May 19-23, 2008.

* cited by examiner

LOAD ESTIMATION IN SOFTER HANDOVER

TECHNICAL FIELD

The invention relates to a method and arrangement for estimation of power-related quantities in cellular communications systems and in particular to such a method and arrangement for handling the effects in softer handover when using advanced interference cancelling or interference suppressing receivers.

BACKGROUND

Wideband Code Division Multiple Access (WCDMA) telecommunication systems have many attractive properties that can be used for future development of telecommunication services. In particular, the enhanced uplink of the WCDMA system is one ingredient in the mobile broadband solution of WCDMA. Now, in order to retain stability of a WCDMA cell, possibly a cell running enhanced uplink, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor, based on which a noise rise measure can be estimated. An optimal and soft algorithm for noise rise estimation based on a similar basic idea of minimum values is disclosed in the published international patent application WO 2007/024166.

To handle increasing uplink data rates, interference cancellation (IC) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of the new IC receiver structure in order to be able to utilize the entire amount of resources. Unless such load estimates are made available it will not be possible to exploit the link gains fully, when scheduling EUL users. In the published international patent application WO 2008/097145, load estimation with IC of this conventional type is handled in analogy with earlier noise rise estimation procedures.

Another approach to limit the effect of interference is to use some kind of interference whitening approaches, such as GRAKE, GRAKE+ or chip equalizer. In GRAKE+, a covariance matrix $\hat{R}_u$, $u=1, \ldots, U$, with an order equal to the number of fingers is first estimated to capture the interference. The codes not used by the present user u may be used in order to estimate the covariance matrix $\hat{R}_u$. The GRAKE+ receiver thus uses an estimated covariance matrix $\hat{R}_u$ that models the interference for computation of the combining weights for the users u, $u=1, \ldots, U$. Expressed mathematically, it can be written:

$$\hat{R}_u \hat{w}_u = \hat{h}_u, u=1, \ldots, U,$$

where $\hat{h}_u$, $u=1, \ldots, U$, is the net channel response of user u and where $\hat{w}_u$ are the combining weights. The effect $\hat{R}_u \hat{w}_u = \hat{h}_u$ is that GRAKE+ essentially whitens the correlated interference and removes large spectral peaks from interferers at certain finger locations and for certain antenna elements. Thus, in GRAKE+, the user experiences a reduced level of interference, immediately after the weight combining step. Note that GRAKE+ is still a linear receiver.

In order to utilize the reduced interference provided by the GRAKE+ receiver, the load estimations have to be performed taking the interference whitening of the GRAKE+ into account. However, in contrary to what is valid for interference cancellation based on regeneration and subtraction, the thermal noise floor is changed in the same manner as the interference reduction obtained by the GRAKE+ process, and can no longer be treated as constant after interference whitening. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available. Similar problems are present for systems utilizing GRAKE, where sub-blocks of the covariance matrix $\hat{R}_u$ used.

There is a related type of interference whitening receiver for WCDMA which is also linear, denoted the chip equalizer. The difference between GRAKE+ and the chip equalizer is simply the order of certain basic operations. The consequence is that the problems of providing a reliable noise rise measure are valid for the systems using the chip equalizer as well.

When using interference cancelling or suppressing receivers, such as e.g. GRAKE+ or chip equalizers, the conventional notion of cell load is no longer applicable.

SUMMARY

An object of the present invention is to provide a method and an arrangement for reducing or avoiding negative effects of load coupling in softer handover in wireless communication systems using interference cancelling or suppressing receivers, such as e.g. GRAKE+ or chip equalizer receivers. A further object is to provide such methods and arrangements, in which the requested computational power is relatively limited.

The object is achieved by methods and arrangements according to the enclosed independent patent claims. Preferred embodiments are defined by the dependent claims.

According to one aspect, a method is provided in a radio base station (RBS), for handling load coupling in softer handover. Within the method, signals from a plurality of UEs (User Equipments) connected to the RBS are received using a interference cancelling or suppressing receiver. The load experienced by the respective UEs is determined. Further, the effect of a possible load coupling in softer handover of at least one of the UEs connected to the RBS is estimated. When the estimated load coupling of a UE fulfills a predefined criterion, at least one entity in the RBS is modified such that the effect of load coupling is reduced or avoided.

According to another aspect, an arrangement adapted to handle load coupling in softer handover is provided in an RBS. The arrangement comprises a functional unit comprising a interference cancelling or suppressing receiver, the functional unit being adapted to receive signals form a plurality of UEs. The arrangement further comprises a functional unit adapted to determine the load experienced by the respective UEs. Each UE experiences an individual load. The arrangement further comprises a functional unit adapted to estimate the effect of load coupling in softer handover of at least one of the UEs connected to the RBS. The arrangement further comprises a functional unit adapted to, when the estimated effect of load coupling of a UE fulfills a certain criterion, modify at least one entity in the RBS, such that the effect of load coupling is reduced or avoided.

The above described method and arrangement may be used for reducing the negative effects of load coupling in softer handover.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
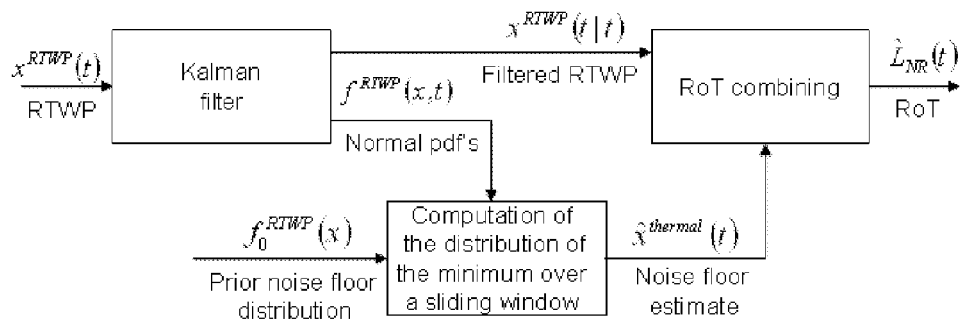
FIG. 1 is a block scheme of an RoT estimation algorithm.

Throughout the entire disclosure, bold letters in equations refer to vector or matrix quantities.

The invention relates to a method and arrangement for handling the possible negative effects which may emerge in softer handover situations when using interference cancelling or suppressing receivers, henceforth denoted "category 1 receivers". However, in order to fully understand the invention and the technical problem which it solves, a recently invented method of estimating the load experienced by a mobile terminal after use of an interference cancelling or suppressing receiver will now first be described.

As previously stated, the conventional notion of cell load is no longer applicable when using category 1 receivers, i.e. interference cancelling or suppressing receivers, due to that different users may experience very different interference situations after interference cancellation or suppression has been performed, i.e. at baseband, even though the interference measured at the antenna connectors, i.e. before interference cancellation or suppression, is approximately equal for the different users.

Examples of category 1 receivers are e.g. GRAKE+, chip equalizer, frequency domain pre-equalizer, frequency domain equalizer, or other receivers involving interference cancelling methods, such as Successive Interference Cancelling (SIC), Parallel Interference Cancelling (PIC) or Multi-User Detection (MUD). When using these receivers, the experienced load will be individual for each UE. Further, these receivers may collect signal energy from more than one cell, e.g. for a UE in softer handover.

Load Without Category 1 Receivers

It is shown, e.g. in references [2]-[4], that without interference cancelling (IC) or reducing receivers, the load at the antenna connector is given by the noise rise, or rise over thermal, RoT(t), defined by:

$$RoT(t) = \frac{RTWP(t)}{N(t)}, \qquad (1)$$

where $N(t)$ is the thermal noise level as measured at the antenna connector. It remains to define what is meant by RTWP(t). This relative measure is unaffected of any de-spreading applied. The definition used here is simply the total wideband power:

$$RTWP(t) = \sum_{k=1}^{K} P_k(t) + I^N(t) + N(t), \qquad (2)$$

which is also measured at the antenna connector. Here, $I^N(t)$ denotes the power received from neighbour cells ($^N$) of the WCDMA system and other sources, such as radar stations and microwave emitting entities. As will be seen below, the major difficulty of any RoT estimation algorithm is to separate the thermal noise power from the interference from neighbor cells.

Another specific problem that needs to be addressed is that the signal reference points are, by definition, at the antenna connector. The measurements are however obtained after the analogue signal conditioning chain in the digital receiver. The analogue signal conditioning chain introduces a scale factor error of about 1 dB, which is difficult to compensate for. Fortunately, all powers of (2) are equally affected by the scale factor error, so, when (1) is calculated, the scale factor error is cancelled as:

$$RoT^{Digital\ Receiver}(t) = \frac{RTWP^{Digital\ Receiver}(t)}{N^{Digital\ Receiver}(t)} \qquad (3)$$

$$= \frac{\gamma(t)RTWP^{Antenna}(t)}{\gamma(t)N^{Antenna}(t)}$$

$$= RoT^{Antenna}(t)$$

In order to understand the fundamental problem of neighbor cell interference when performing load estimation, note that:

$$I^N(t)+N(t)=E[I^N(t)]+E[N(t)]+\Delta I^N(t)+\Delta N(t), \quad (4)$$

where E[ ] denotes mathematical expectation and where Δ denotes the variation around the mean. The fundamental problem can now be clearly seen. Since there are no measurements available in the RBS that are related to the neighbor cell interference, a linear filtering operation can at best estimate the sum $E[I^N(t)]+E[N(t)]$. This estimate cannot be used to deduce the value of E[N(t)]. The situation is analogous to a situation where the sum of two numbers is available. Having access to the sum does, however, not enable retrieving the values of the individual numbers. This issue is analyzed rigorously for the RoT estimation problem in [3], where it is proved that the noise power floor is not mathematically observable.

RoT Estimation Algorithms in Prior Art

Sliding Window Algorithm

The RoT estimation algorithm currently in use is depicted in FIG. 1. It is further described in detail in reference [2]. The algorithm estimates the RoT, as given by (1). The main problem solved by the estimation algorithm is the accurate estimation of the thermal noise floor N(t). Since it is not possible to obtain exact estimates of this quantity due to the neighbor cell interference, the estimator therefore applies an approximation, by consideration of the soft minimum as computed over a relative long window in time.

It is important to understand that this estimation relies on the fact that the noise floor is constant over very long periods of time, disregarding the small temperature drift.

Recursive Algorithm

The sliding window algorithm of the above section has the disadvantage of requiring a large amount of storage memory. This becomes particularly troublesome in case a large number of instances of the algorithm are needed, as may be the case when IC is introduced in the uplink.

To reduce the memory consumption a recursive algorithm was disclosed in the patent application [6]. The algorithm disclosed in [6] reduces the memory requirements of the sliding window scheme discussed above at least by a factor of 100.

The invention disclosed is applicable both to the sliding window RoT estimation algorithm and the recursive algorithm of [6].

Cell Stability Oriented Load Estimation Algorithms in Prior Art

The prior art cell stability load estimation functionality, exploits load factors for each user. In their simplest form the load factors are given by:

$$L_u = \frac{P_u}{RTWP} = \frac{(C/I)_u}{1+(C/I)_u}, u = 1, \dots, U, \quad (5)$$

where $P_u$ is the power of user u. Load factors are then summed up, for each power controlled user. In this way the neighbor cell interference is not included in the resulting load measure. This is reasonable since the neighbor cell interference should not affect the own cell power control loop, at least not when first order effects are considered.

Interference Cancellation (IC) with Category 1 Receivers, such as GRAKE+ and Chip Equalizers The difference with GRAKE+ receivers as compared to conventional RAKE receivers, is that each terminal "sees" a reduced level of interference, immediately after the weight combining step. In GRAKE+ receivers, a covariance matrix $\hat{R}_u$, u=1, . . . , U, of an order equal to the number of fingers, is first estimated to capture the interference. The codes not used by the present user u may be used in order to estimate $\hat{R}_u$. This procedure is described e.g. in [1].

The GRAKE+ receiver uses the estimated covariance matrix that models the interference for computation of the combining weights for the users u, u=1, . . . , U.

$$\hat{R}_u\hat{w}_u=\hat{h}_u, u=1,\dots,U \quad (6)$$

where $\hat{h}_u$, u=1, . . . , U, is the net channel response of user u and where $\hat{w}_u$ are the combining weights.

The effect of (6) is that a GRAKE+ receiver essentially whitens the correlated interference and removes large spectral peaks from interferers at certain finger locations and for certain antenna elements.

Measurement of Load After Processing in Category 1 Receiver

To see how load can be estimated when taking account to the GRAKE+ IC gain, the powers after weight combining in the GRAKE+ were studied at sufficient statistics level. Assuming that the received signal of user u on code $k \in \Omega_u$ is:

$$y_{u,k}=h_u s_{u,k}+I_{u,k}+N_{u,k}, u=1,\dots,U, k=1,\dots,K \quad (7)$$

where $\Omega_u$ denotes the set of codes for user u; $s_{u,k}$, u=1, . . . , U, k=1, . . . , K, is the signal; $I_{u,k}$, u=1, . . . , U, k=1, . . . , K, is the interference; and $N_{u,k}$, u=1, . . . , U, k=1, . . . , K, is the thermal noise signal, i.e. not power; and $\hat{h}_u$, u=1, . . . , U, is the net channel response of user u. The GRAKE+ then performs weight combining in order to get the sufficient statistics $z_{u,k}^{G+}$ according to the equations:

$$\hat{z}_{u,k}^{G+}=\hat{w}_u^H y_{u,k}=\hat{w}_u^H \hat{h}_u s_{u,k}+\hat{w}_u^H I_{u,k}+\hat{w}_u^H N_{u,k}, u=1,\dots,U, k=1,\dots,K. \quad (8)$$

$$\hat{R}_u\hat{w}_u=\hat{h}_u, u=1,\dots,U \quad (9)$$

Here $\hat{w}_u$ are the combining weights of the GRAKE+, whereas the estimated covariance matrix that models the interference for computation of the combining weights for the users u is given by $\hat{R}_u$. Equations (8) and (9) have three main implications: one indicating how power measurements can be done; one indicating a scale factor problem, which is addressed below; and a third implication.

The third implication is the one of interest for the invention. Noting that the different antenna elements are directly related to the components of $\hat{h}_u$, it follows that (9) and (8) scrambles the powers related to the individual antenna elements, thus rendering the antenna relations completely unknown after GRAKE+ processing. It is therefore not possible to distribute the load after GRAKE+ processing into quantities relating to specific cells, e.g. when in softer handover.

Further, when studying equation (8), it was realized that the effect of the GRAKE+ weight combining is the same as if an artificial received signal $z_{u,k}^{G}$; would be processed. Since this artificial signal $z_{u,k}^{G+}$ thus reflects the weight combining, and thereby the IC gains of the GRAKE+ receiver, the artificial signal $z_{u,k}^{G+}$, u=1, . . . , U, k=1, . . . , K, is concluded to be a relevant starting point for load estimation.

As stated above, the load estimation used when not taking interference cancellation or suppression in category 1 receivers into account, i.e. "without IC", operates by processing the RTWP (Received Total Wideband Power), and in the future possibly the RSEPS (Received Scheduled E-DCH (Enhanced Dedicated Channel) Power Share). Thus, one approach for load estimation when taking the interference cancellation or suppression in category 1 receivers into account, i.e. "with IC", would be to reuse this concept as far as possible. It is thus realized, that in order to be able to reuse the load concept applied without IC, power signals similar to the ones used without IC, i.e. RTWP or RSEPS, would need to be formed from the artificial signal $z_{u,k}^{G+}$, u=1, . . . , U, k=1, . . . , K.

It should be noted that it is not clear if the proposed approach of reusing the load concept applied "without IC" is precise or optimal. However, at the present time it is the only approach available.

User Powers Associated with the GRAKE

Squaring (8) and assuming a low degree of correlation between its three terms, leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k}$$
$$N_{u,k}^H \hat{w}_u \equiv S_{u,k}^{G+} + I_{u,k}^{G+} + N_{u,k}^{G+}, \quad u=1, \ldots, U, k=1,\ldots,K. \tag{10}$$

The rise over thermal, as seen by user u is now (6), by definition:

$$RoT_u^{G+} \equiv \frac{S_u^{G+} + I_u^{G+} + N_u^{G+}}{N_u^{G+}} \tag{11}$$

$$S_u^{G+} = \sum_{k \in \Omega_u} S_{u,k}^{G+} \tag{12}$$

$$I_u^{G+} = \sum_k I_{u,k}^{G+} \tag{13}$$

$$N_u^{G+} = \sum_k N_{u,k}^{G+}. \tag{14}$$

It should be noted that it is unclear how to distinguish between $S_{u,k}^{G+}$, $I_{u,k}^{G+}$ and $N_{j,k}^{G+}$ for $k \in \Omega_u$. The algorithm disclosed here avoids many of these problems, since both $I_{u,k}^{G+}$ and $N_{u,k}^{G+}$ are computed from other quantities. It should further be noted that in equation (10), $S_{u,k}^{G+} = \hat{w}_u^H \hat{h}_u \hat{h}_u^H \hat{w}_u |s_{u,k}|^2$, i.e. the power is expressed starting with the transmitted code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (10)-(14).

Computation of $S_u^{G+}$

The signal power is computed directly from (12). Using (10) and (12) then results in:

$$S_u^{G+} = \sum_{k \in \Omega_u} S_{u,k}^{G+} \tag{15}$$

$$= \hat{w}_u^H \hat{h}_u \hat{h}_u^H \hat{w}_u \sum_{k \in \Omega_u} |s_{u,k}|^2$$

$$= \hat{w}_u^H \hat{h}_u \hat{h}_u^H \hat{w}_u \hat{E}_{s,u}$$

$$= |\hat{w}_u^H \hat{h}_u|^2 \hat{E}_{s,u},$$

$$u = 1, \ldots, U$$

Note that computation of the signal energy $\hat{E}_{s,u}$ is quite intricate, including e.g. the involved beta factors. The beta factors are used in order to manage data channel power by providing a scale factor with reference to the control channel power, the latter being subject to fast power control. Thereby, data channel power becomes slaved to control channel power. Beta factors are further described e.g. in 3GPP TS 25.213.

Computation of $N_u^{G+}$ (i) Assuming White Noise Power Floor:

The idea here is to rely on the thermal noise power floor estimation algorithm used since the introduction of enhanced uplink, to estimate the thermal noise power floor before any GRAKE+ processing. A main problem then arises since the thermal noise is scaled by $\hat{w}_u$ when the power is evaluated. This means that the thermal noise power level will no longer appear constant.

The approach taken to circumvent this problem builds on the calculation of the scale factor by which the thermal noise power is scaled. To compute this quantity, first note that when the wideband thermal noise power floor is estimated before GRAKE+ processing, e.g. with noise floor estimators known in prior art, the following quantity is estimated:

$$\hat{N} = \frac{1}{M} \sum_{m=1}^{M} \sum_{k=1}^{K} (N_{u,k}^m)^H N_{u,k}^m \xrightarrow[M \to \infty]{} KE[(N_{u,k})^H N_{u,k}] \tag{16}$$

$$= K P_{N_{u,k}}$$

$$= K \frac{1}{K} P_N$$

$$= N_0,$$

where $N_0$ is the thermal noise power floor. However, the power at the G-RAKE+ signal point is:

$$\hat{N}^{G+} = \frac{1}{M} \sum_{m=1}^{M} \sum_{k=1}^{K} (\hat{w}_u^H N_{u,k}^m)^H \hat{w}_u^H N_{u,k}^m \tag{17}$$

$$= \frac{1}{M} \sum_{m=1}^{M} \sum_{k=1}^{K} tr((\hat{w}_u^H N_{u,k}^m)^H \hat{w}_u^H N_{u,k}^m)$$

$$= \frac{1}{M} \sum_{m=1}^{M} \sum_{k=1}^{K} tr(\hat{w}_u^H N_{u,k}^m (\hat{w}_u^H N_{u,k}^m)^H)$$

$$= \frac{1}{M} \sum_{m=1}^{M} \sum_{k=1}^{K} tr(\hat{w}_u^H N_{u,k}^m (N_{u,k}^m)^H \hat{w}_u)$$

$$= tr\left(\sum_{k=1}^{K} \hat{w}_u^H \left(\frac{1}{M} \sum_{m=1}^{M} N_{u,k}^m (N_{u,k}^m)^H\right) \hat{w}_u\right) \xrightarrow[M \to \infty]{} tr$$

$$(K \hat{w}_u^H E[N_{u,k}(N_{u,k})^H] \hat{w}_u)$$

$$= tr(K \hat{w}_u^H (N_0/K) I \hat{w}_u)$$

$$= \hat{w}_u^H \hat{w}_u N_0$$

$$= \hat{w}_u^H \hat{w}_u \hat{N}.$$

The conclusion is that the thermal noise floor at the GRAKE+ signal point can be obtained from the noise floor estimate before GRAKE+ processing, by a multiplication with the scale factor $$\kappa_u^{G+} = (\hat{w}_u)^H \hat{w}_u, u=1, \ldots, U. \tag{18}$$

This gives:

$$N_u^{G+} = \kappa_u^{G+} \hat{N}, u=1, \ldots, U \tag{19}$$

The computation of the scale factor requires an additional inner product for each user.

(ii) Assuming Coloured Noise Power Floor

This subsection discusses the case where the result of (16) is replaced by the more general assumption:

$$\frac{1}{M}\sum_{m=1}^{M}\sum_{k=1}^{K} N_{u,k}^m (N_{u,k}^m)^H \xrightarrow[M\to\infty]{} KE[N_{u,k}(N_{u,k})^H] = K\frac{N_0}{K}R_N = N_0 R_N, \quad (20)$$

i.e., the case when sampling is fast enough to reflect the shape of the uplink spectrum. In this case it follows that (16) is transformed to:

$$\hat{N} = \frac{1}{M}\sum_{m=1}^{M}\sum_{k=1}^{K} (N_{u,k}^m)^H N_{u,k}^m \xrightarrow[M\to\infty]{} KE[(N_{u,k})^H N_{u,k}] = \quad (21)$$

$$Ktr(E[N_{u,k}(N_{u,k})^H]) = N_0 tr(R_N)$$

Furthermore, (17) is transformed into:

$$\hat{N}^{G+} = N_0 tr(\hat{w}_u^H R_n \hat{w}_u). \quad (22)$$

The end result in this case is the scale factor:

$$\kappa_u^{G+} = \frac{tr(\hat{w}_u^H R_N \hat{w}_u)}{tr(R_N)} \quad (23)$$

Computation of $I_u^{G|}$ Using Available SINRs

In e.g. a planned ASIC, the code power to interference ratio would be:

$$(C/I)_u^{G+} = \frac{S_u^{G+}}{I_u^{G+} + N_u^{G+}}, u = 1, \ldots, U. \quad (24)$$

It can be noted that in (24), all quantities except $I_u^{G+}$ have been computed, see (17) and (19). Using these quantities, (23) can be solved for $I_u^{G+}$, giving:

$$I_u^{G+} = \frac{S_u^{G+}}{(C/I)_u^{G+}} - \kappa_u^{G+}\hat{N}, u = 1, \ldots, U. \quad (25)$$

In the planned ASIC mentioned above, the $(C/I)_u^{G+}$ quantity will not be directly available. It can however be directly related to SINR (Signal to Interference-and-Noise Ratio) which is estimated in the ASIC. This is performed as:

$$(C/I)_u^{G+} = \frac{\left(\begin{array}{c}\beta_{u,DPCCH}^2 + \beta_{u,EDPCCH}^2 + \\ n_{u,codes}\beta_{u,EDPDCH}^2\end{array}\right)}{\beta_{u,DPCCH}^2 SF_{u,DPCCH}} SINR_u^{G+} = \frac{\beta_{u,effective}^2}{SF_{u,DPCCH}} SINR_u^{G+} \quad (26)$$

which gives:

$$I_u^{G+} = \frac{S_u^{G+}}{(C/I)_u^{G+}} - \kappa_u^{G+}\hat{N} = \frac{SF_{u,DPCCH}}{\beta_{u,effective}^2} \frac{S_u^{G+}}{SINR_u^{G+}} - \kappa_u^{G+}\hat{N}. \quad (27)$$

Even though an exemplary embodiment using an ASIC is described above, embodiments may also be implemented using other suitable software and/or hardware means, such as e.g. FPGAs (Field-Programmable Gate Array) or DSPs (Digital Signal Processor).

Computation of $RoT_u^{G+}$

When (15), (19) and (27) are inserted in (11), the end result becomes:

$$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right), \quad (28)$$

$$u = 1, \ldots, U$$

These measures, for each user, are then combined into an uplink measure as outlined below. Note that (28) provides some interesting insights. When the SINR is high, the RoT for the user is essentially determined by the remaining own power of the user. The RoT then increases when the SINR gets worse.

Computation of RTWP and RSEPS Equivalents

The computation of the equivalent of RTWP and RSEPS power, at the GRAKE+ signal point, is discussed next. It follows from (28) that the equivalent of RTWP, seen by user u, becomes:

$$S_{u,RTWP}^{G+} = S_u^{G+}\left(1 + \frac{SF_{u,DPCCH}}{\beta_{u,effective}^2}\frac{1}{SINR_u^{G+}}\right), u = 1, \ldots, U. \quad (29)$$

The equivalent of RSEPS, as seen by user u, is therefore obtained by a summation over the RSEPS user codes, when still using $\hat{h}_u$ and $\hat{w}_u$:

$$S_{u,RSEPS}^{G+} = \sum_{u_{RSEPS}=1}^{U_{RSEPS}} S_{u(u_{RSPES})}^{G+}, u = 1, \ldots, U \quad (30)$$

$$S_{u(u_{RSPES})}^{G+} = \sum_{k\in\Omega_{u(u_{RSEPS})}} S_{u,k}^{G+} = \hat{w}_u^H \hat{h}_u \hat{h}_u^H \hat{w}_u \sum_{k\in\Omega_{u(u_{RSEPS})}} |s_{u,k}|^2 = \quad (31)$$

$$\hat{w}_u^H \hat{h}_u \hat{h}_u^H \hat{w}_u \hat{E}_{s,u(u_{RSEPS})} = |\hat{w}_u^H \hat{h}_u|^2 \hat{E}_{s,u(u_{RSPES})},$$

$$u_{RSEPS} = 1, \ldots, U_{RSEPS}.$$

Note again that the channel model of user u is retained when summing over the codes of the RSEPS users. Hence the computation needs to be performed once for each user.

Uplink Load Measures for GRAKE+

Figure 5:
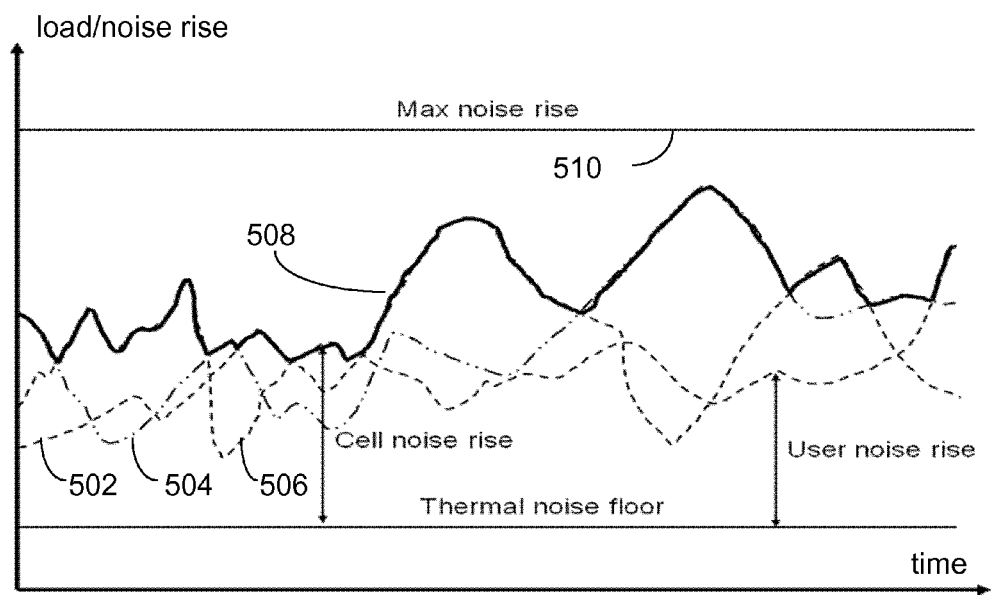
FIG. 5 is a diagram illustrating the load experienced by three different UEs, and the estimated cell load when applying the "worst case" approach.

There are at least three different approaches for estimating an uplink load measure resulting from the combination of the loads experienced by the terminals in a cell. However, the approach relevant for the invention is the so called "worst case" approach. The worst case approach involves that the load experienced by the user terminal that experiences, or "sees", the highest total load in a cell is used for cell load estimation purposes. This approach for cell load estimation is illustrated in FIG. 5. The worst case quantities relevant at cell level are then given by the following equations $$u_{max} = \underset{u}{\operatorname{argmax}}(RoT_u^{G+}) \quad (32)$$

$$\max(RoT_u^{G+}) = RoT_{u_{max}}^{G+} \quad (33)$$

-continued $$\max(S_{RTWP}^{G+}) = S_{u_{max},RTWP}^{G+} \quad (34)$$

$$\max(S_{RSEPS}^{G+}) = S_{u_{max},RSEPS}^{G+} \quad (35)$$

The respective experienced load, 502-506, of three different UEs in a cell is illustrated in FIG. 5. The bold line 508 illustrates the cell load, according to a "worst case" approach. In this worst case approach, the estimated cell load is equal to the highest experienced load of a UE in the cell. Cell load could also be denoted cell noise rise. The maximal noise rise 510 of the cell is the load limit of the cell. The limit 510 should not be exceeded in order to maintain coverage and stability. The difference between the cell load 508 and the maximal noise rise 510 is the power margin, which may also be denoted the "headroom" or the capacity margin.

Problems with Existing Solutions

Above, a recently invented concept for estimating the load experienced by a terminal after interference suppression is described. During the work with the above described load estimation concept, a new problem was realized: A UE experiencing a high load in a first cell could completely block the capacity in a second cell, when being in softer handover with the first and the second cell. This phenomenon has been denoted "load coupling" and has been concluded to be induced by category 1 receivers. The load coupling does not depend on the load in the second, or target, cell prior to softer handover. However, the effect of the load coupling in softer handover depends on the load situation in the second cell prior to softer handover.

In order to address the problem of receiver induced load coupling between cells during softer handover, a rather lengthy discussion is needed. The problem will be further explained below with reference to FIGS. 2-4.

Figure 2:
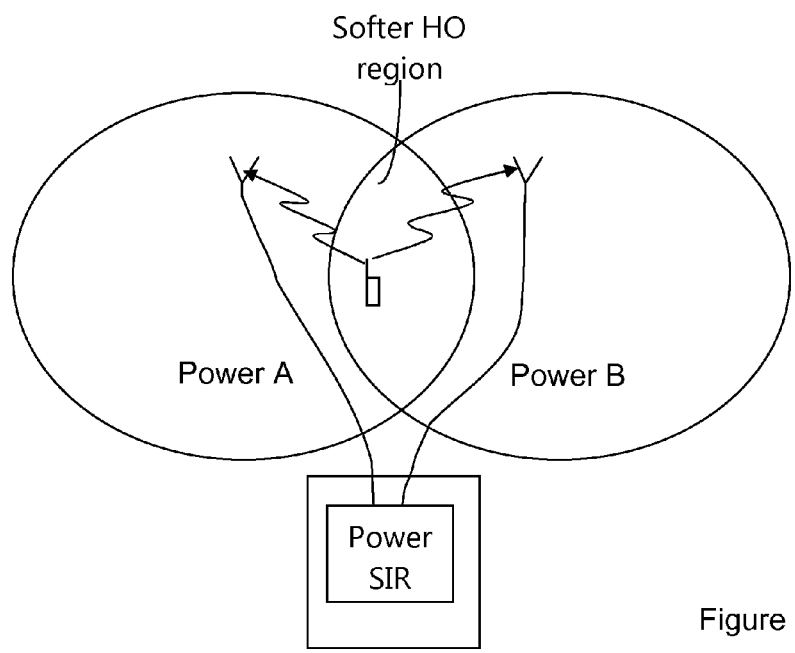
FIG. 2 is a schematic illustration of a UE in softer handover.

The effects of interference whitening when in softer handover are studied within the two-cell setup of FIG. 2. In the following examples, the category 1 receivers used are assumed to be GRAKE+ receivers. As a prerequisite for the discussion, it should be noted that when a UE is in softer handover with, e.g. two cells, the GRAKE+ receiver spreads its fingers over both cells and all four antennas, assuming two-way receiver diversity. The received data is hence combined softly. As a consequence, the measured SIR after GRAKE+ processing is the same for both cells. It should be noted that none of the effects discussed here appear in soft handover, since there is no way for a GRAKE+ receiver to distribute fingers between RBSs.

Figure 3:
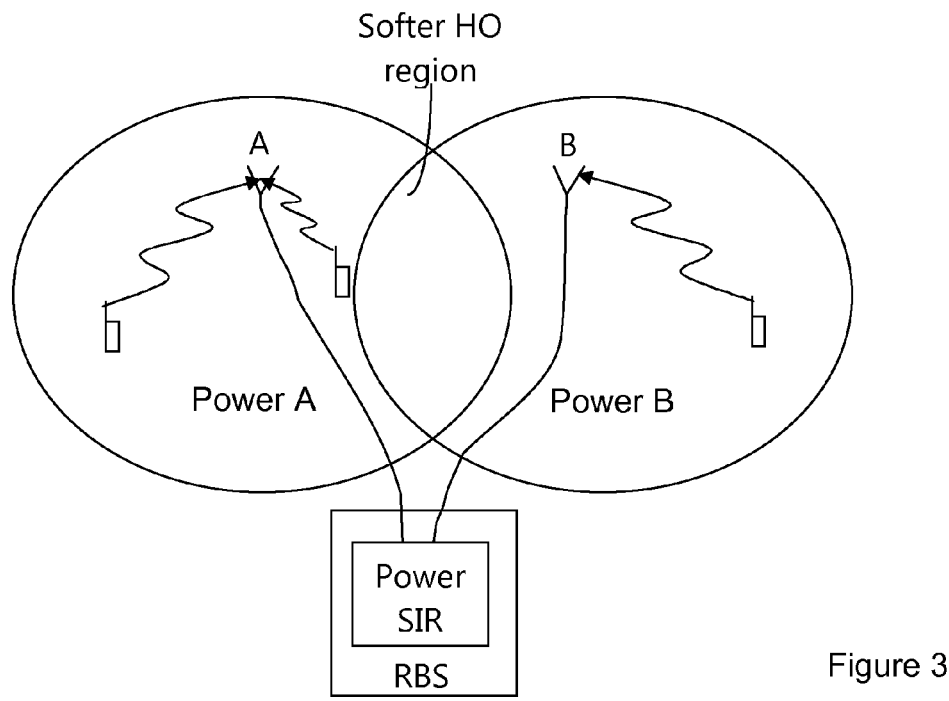
FIG. 3 is a schematic illustration of a two cell scenario, where no UE is in softer handover.

Then consider a situation with interfering UEs in cell A and cell B, as shown in FIG. 3, where it is assumed that the UE of the user of interest is just outside the softer handover region. In this situation, GRAKE+ fingers are directed towards the antenna elements in cell A. The powers on the air interface by which the UE transmission is softly combined are then given by:

$$P_u^A = x \quad (36)$$

$$P_u^B = 0. \quad (37)$$

Figure 4:
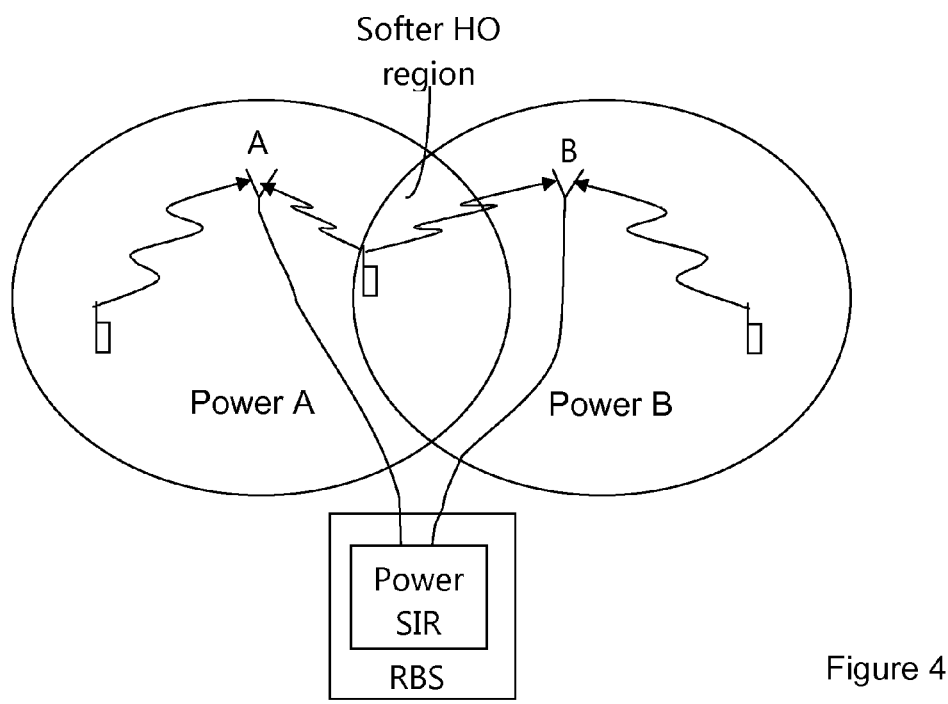
FIG. 4 is a schematic illustration of a two cell scenario, where one UE is in softer handover.

Then, after a small move, the UE has entered the softer handover region and is in softer handover with cell A and cell B, as illustrated in FIG. 4, where cell B is the target node. The GRAKE+ fingers are then distributed over the antenna elements in cell A and cell B. Assuming a balanced fading situation, symmetry of fingers and powers follow, as shown in FIG. 4. Now, at least unless all GRAKE+ fingers were already allocated to cell A before the softer handover, more fingers are used to collect energy, and thus more received power is used for combining. Thus, since the inner loop power control keeps the SIR at the SIR target, the UE transmission power can be reduced.

Hence the powers on the air interface by which the UE transmission is softly combined are given by:

$$P_u^A = y \quad (38)$$

$$P_u^B = y, \quad (39)$$

where normally y≤x. This is not necessarily true in case of finger limitation, since the gains of cell B may be less than of cell A. Without GRAKE+ and without finger limitation, y≈x/2 could be approximately true. It may hence be tempting to conclude that the loads of both cells have been reduced and that equation (28) that accounts for all collected energy with $S_u^{G+}$, would overestimate the load by a factor of about 2. This is however a misunderstanding.

The reason is that what matters is the load, as experienced by the UE after GRAKE+ processing. When this experienced load is close to or on the cell power limit, any increase of interference in either cell would create a violation of coverage or stability. The reason for this is again that the load experienced after interference cancellation and interference whitening is individual for each user. The cell load of a cell is obtained by a combination over the users of the cell. For example, a bound on the cell load may be achieved from the assessment, for each cell, of the terminal experiencing the highest load, cf. "the worst case approach". In particular, this means that the load experienced by a UE in softer handover affects the load of all cells with which the UE is in softer handover. It should be noted that this is due to the load coupling introduced by the receiver—it has nothing to do with the load computation.

The load coupling creates a problem. Below, this problem will be further explained with reference to FIGS. 3 and 4. It is assumed that, in the situations in FIGS. 3-4, the fading is unbalanced so that:

$$P_u^A = y \quad (40)$$

$$P_u^B = \notin y. \quad (41)$$

where ∉ is very small, e.g. 0.01, referring to FIG. 4. It is noted that such situations are not infrequent in practice, as shown by live measurements. It is further assumed that the interference situation in cell A alone is such that the UE is on the stability or coverage limit, thereby providing the worst case load for that cell before going into softer handover. It is also assumed that the interference power in cell B is low, thereby leaving plenty of headroom, i.e. capacity margin left e.g. to the instability point, before the UE enters softer handover.

Then, when the UE enters softer handover, the fading makes the interference situation in cell B so poor for the UE that there are no combining gains. Hence, the load experienced by the UE remains the same as it was before entering softer handover. The problem is only that now any significant increase of the interference coming from cell B will make the UE violate the stability or coverage constraints. The effect is hence that cell B becomes blocked by a bad interference situation in cell A.

Figure 6:
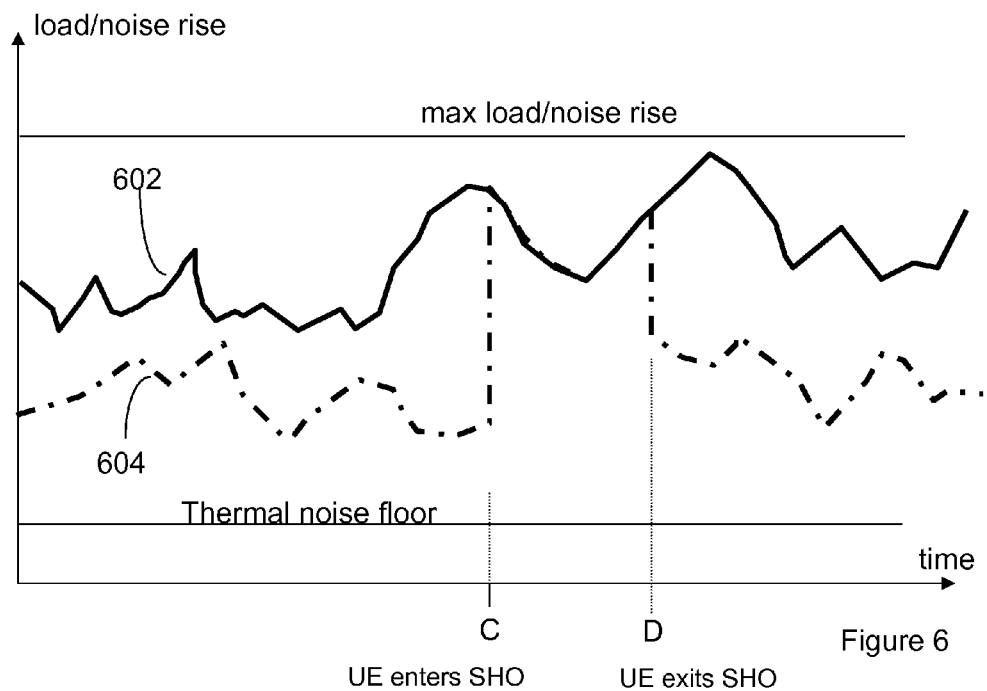
FIG. 6 is a diagram illustrating the cell loads of two cells applying the "worst case" approach.

An example of load coupling is illustrated in FIG. 6. The solid line 602 illustrates the cell load in a cell A, and the dash-dotted line illustrates the cell load in a cell B. At time C, a UE experiencing the highest load in cell A enters a softer handover with cell B. Until time C, the load in cell B is lower than in cell A. At time C, the load coupling of the UE entering softer handover entail that the load in cell B increases to the same level as in cell A, since the UE in softer handover now is the UE experiencing the highest load also in cell B. Below, some embodiments addressing this problem are described.
Exemplary Procedures in RBS, FIGS. 7-8

Figure 7:
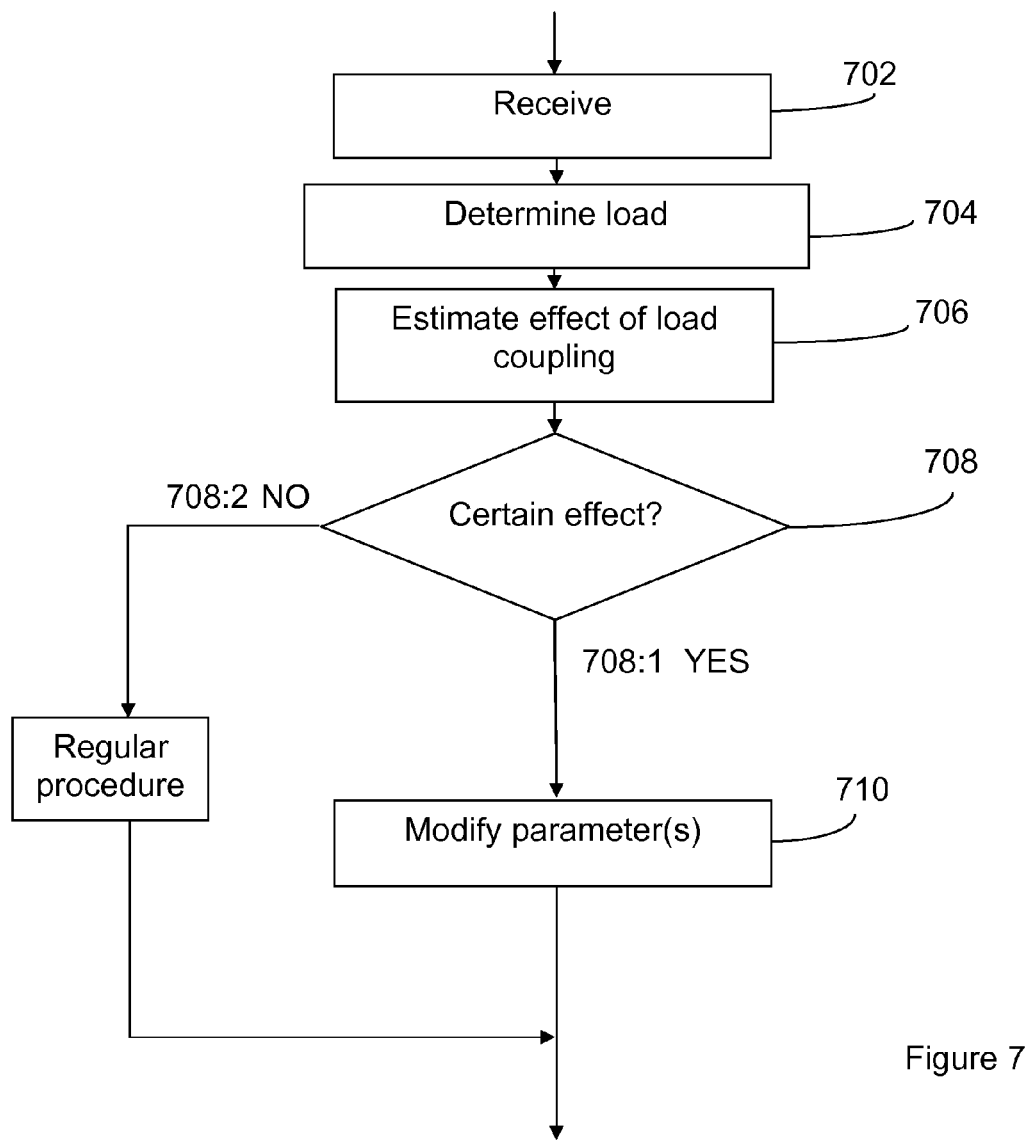
FIG. 7-8 are flow charts illustrating procedure steps, according to different embodiments.

An embodiment in a RBS of the procedure for handling load coupling in softer handover, will now be described with reference to FIG. 7. Initially, signals from a plurality of UEs connected to the RBS are received in a step 702. The signals are received using a category 1 receiver, e.g. a GRAKE+, a chip equalizer, a frequency domain pre-equalizer, or a frequency domain equalizer, which may cancel or suppress, e.g. whiten, interference. Then, in a next step 704, the load experienced by the respective UEs are determined.

The experienced load may be determined e.g. by determining the Rise over Thermal (RoT) after processing in the category 1 receiver, according e.g. to equation (28) or similar. The calculation of the experienced load could be performed as if the UEs were in softer handover, i.e. taking possible additional antenna elements into account, since there may be a difference between the experienced load prior to entering softer handover and the experienced load when having entered softer handover. However, it may also be assumed that the experienced load will be the same before and during softer handover.

Further, the effect of load coupling in softer handover of at least one of the UEs connected to the RBS is estimated in a next step 706. For a UE to be able to be in softer handover, the RBS should control more than one cell or cell sector. However, the UEs do not actually have to be in softer handover when this estimation is performed. This estimation may involve comparing the load experienced by the at least one UE to the loads experienced by the other respective UEs, and/or to one or more predefined thresholds. When it is determined in a next step 708 that the estimated effect of load coupling of a UE fulfills a predefined criterion, and the load coupling thus is expected to have a negative effect on conditions in a target cell, at least one entity in the RBS is modified in a step 710, such that the effect of the load coupling is reduced or avoided.

The modification of an entity in the RBS may be performed when the UE is considered for or involved in softer handover, and/or before it is known if the UE will be considered for a softer handover, depending e.g. on which entity that is to be modified. One example of an entity which could be modified as a preventive measure when a UE is not even close to a softer handover situation, is a flag or similar, which may be set to indicate that a certain UE should not be allowed into softer handover. It is possible that a UE is allowed into softer handover by an RNC, but that the RBS does not include "the bad cell" in the uplink receiver. Thus, the RNC and the UE treat the connection as it is in softer handover, but in fact it is not.

If the estimated effect of load coupling does not fulfill any predefined criterion, the load coupling is not expected to have a negative effect on the conditions in a target cell, and consequently, a possible softer handover will follow a regular procedure. This is also illustrated in FIG. 8.

Figure 8:
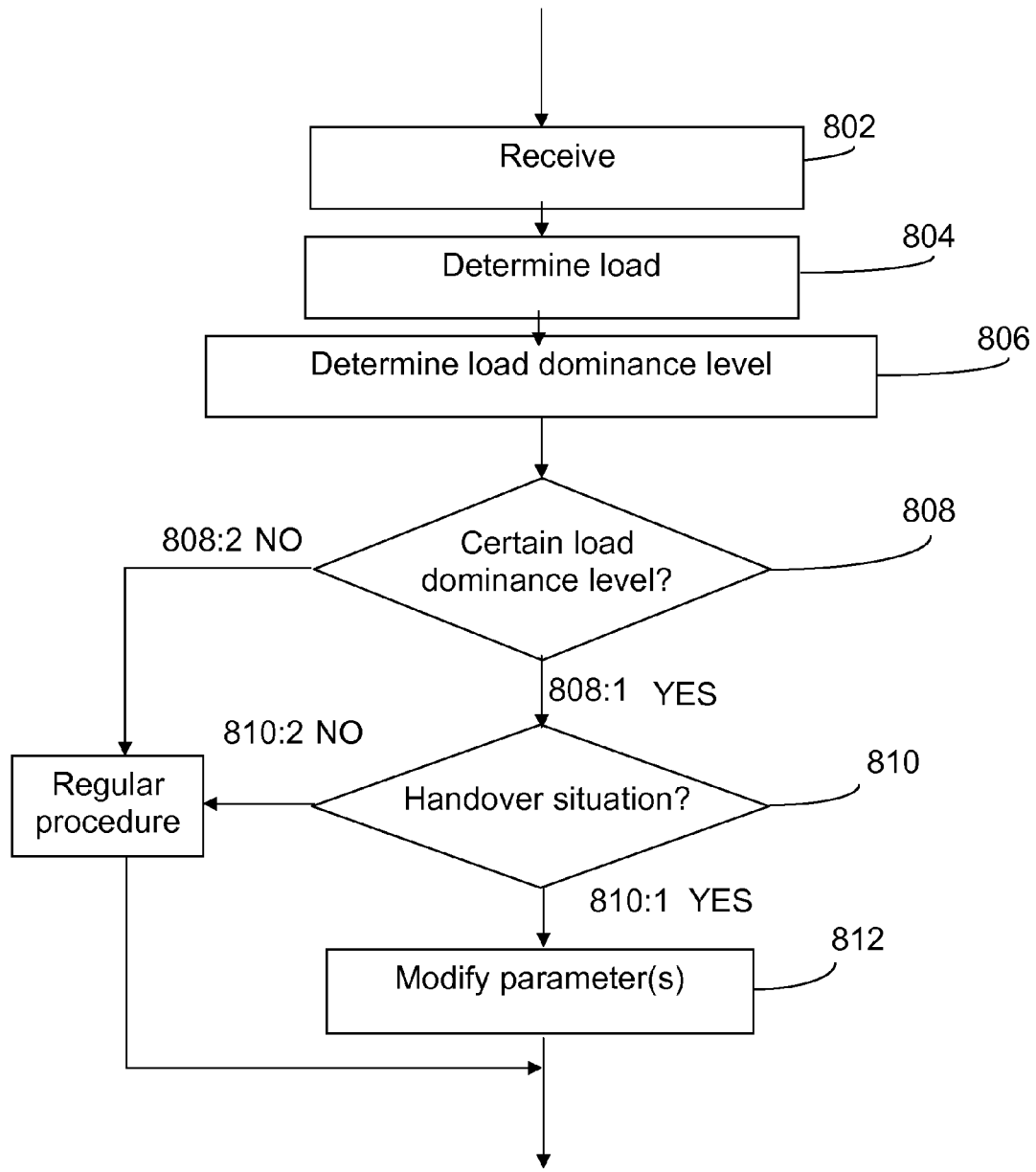

In the embodiment illustrated in FIG. 8, the load dominance level of a UE is determined in a step 806. The load dominance level of a UE could be described as how dominating the load experienced by the UE is, when compared to the load experienced by other UEs served by the RBS. The "level" could be related to absolute or relative load measures. The determining of the load dominance level of a UE could involve comparing the load experienced by the UE to the loads experienced by the other respective UEs, and/or to one or more predefined thresholds. Further, it is determined in a step 808, whether the load dominance level of a UE is of a certain grade or value 808:1 or not 808:2. Then, in a next step 810, it is determined whether a handover situation is at hand 810:1 or not 810:2. When a handover situation is at hand 810:1, at least one entity in the RBS is modified in a step 812, such that the effect of load coupling is reduced or avoided. The steps 802-804 and 812 are similar to the respective corresponding steps 702-704 and 710, described above.
Exemplary Arrangement in an RBS, FIG. 9

Below, an exemplary arrangement 900, adapted to enable the performance of the above described procedure in an RBS 901, will be described with reference to FIG. 9. The arrangement 900 comprises a receiving unit 902, which is adapted to receive signals transmitted from a plurality of UEs. The receiving unit 902 comprises at least one category 1-receiver, for example a GRAKE+, a chip equalizer, a frequency domain pre-equalizer, or a frequency domain equalizer. The arrangement 900 further comprises a determining unit 904, which is adapted to determine the load experienced by the respective UEs. The determining unit 904 could e.g. be adapted to determine the Rise over Thermal (RoT) after processing in the at least one category 1 receiver, according e.g. to equation (28), or similar.

The arrangement 900 further comprises an estimating unit 906, which is adapted to estimate the effect of load coupling in softer handover of at least one of the UEs connected to the RBS 901. The estimating unit 906 could e.g. be adapted to compare the load experienced by the at least one UE to the loads experienced by the other respective UEs, and/or to one or more predefined thresholds. The notion of softer handover implies that the RBS is controlling more than one cell or cell sector. Further, the arrangement 900 comprises a control unit 908, which is adapted to modify at least one entity in the RBS when the estimated effect of load coupling of a UE in softer handover is determined to fulfill a certain criterion.

Figure 9:
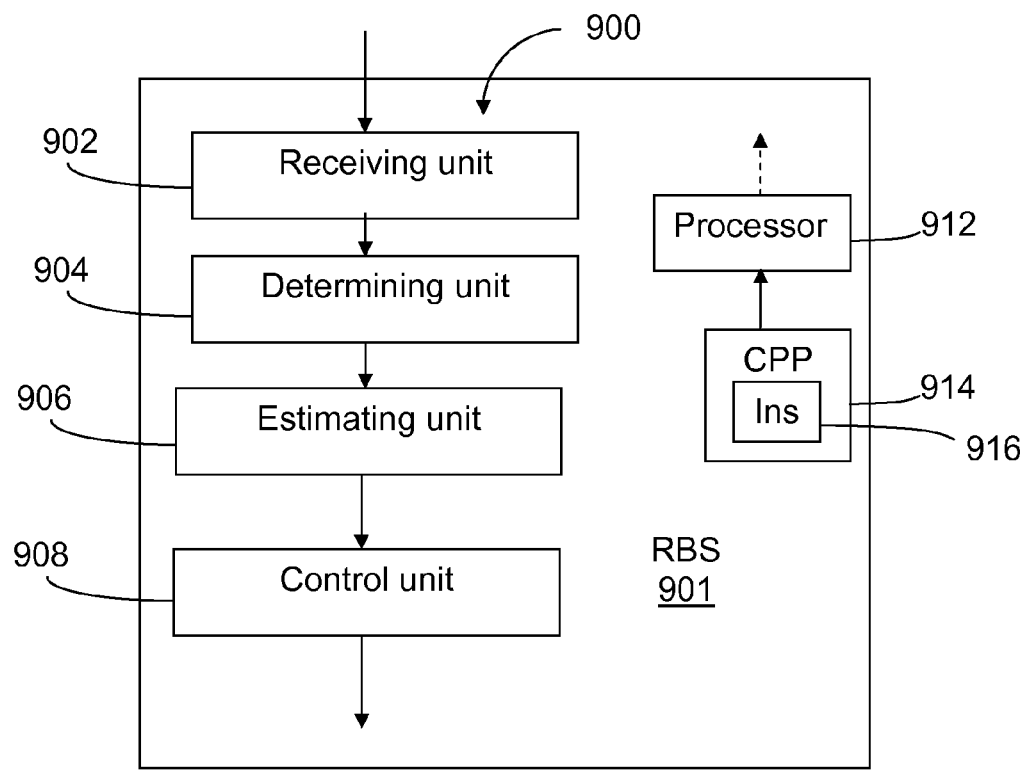
FIG. 9 is a block diagram illustrating an arrangement in a radio base station, according to an embodiment.

In FIG. 9 is also illustrated a computer program product (CPP) 914 which comprises instructions 916, which when executed by a processor 912, or similar, will cause the units 902-908 to perform their tasks according to any embodiments of the above-described procedure. Connections between the processor 912 and the units 902-908 are schematically illustrated by a dashed arrow from processor 912.

It should be noted that FIG. 9 merely illustrates various functional units of the arrangements 900 in a logical sense. The functional units could also be denoted e.g. "modules" or "circuits", or be parts of circuits. However, the skilled person is free to implement these functions in practice using any suitable software and/or hardware means, such as e.g. ASICs (Application-Specific Integrated Circuit), FPGAs (Field-Programmable Gate Array) and DSPs (Digital Signal Processor). Thus, the invention is generally not limited to the shown structure of the arrangement 900.
Removing or Reducing the Effect of Load Coupling in Soft Handover (SHO)

Below is disclosed different means i)-vii) for either removing or reducing the effect of the category 1 receiver induced load coupling problem, described in the previous sections. The below described alternatives involve modifying an entity in the RBS, as previously discussed in connection e.g. with FIGS. 7-9.

i) Reallocation of all GRAKE+ Softer Handover Users to RAKE Receivers

All GRAKE+ users entering softer handover could be re-allocated from GRAKE+ to RAKE receivers, or more generally, be re-allocated from a category 1 receiver to a category 2 receiver. The term "category 2 receiver" refers to receivers that do not scramble signal energies from different cells in softer handover. Examples are receivers without interference cancellation or interference suppression capability, such as e.g. RAKE receivers. The RAKE receivers allow signal energy to be attributed to the respective antenna and thereby to the correct cell. For the RAKE it is therefore possible to discriminate contributions for a UE in handover to cell A or to cell B. The load experienced in the respective cells for such UEs can then be computed with the conventional RoT measure (1), after which it is combined with the users of the respective cell in the search for the worst case users. The consequence of the above is of course an increased interference due to the reduced receiver performance.

ii) Reallocation of Limiting GRAKE+ Softer Handover User(s) to (a) RAKE Receiver Alternatively, only the limiting GRAKE+ user, or the UEs experiencing the highest RoT after GRAKE+ processing entering softer handover could be re-allocated from GRAKE+ to RAKE receivers. The consequence of the above is of course an increased interference due to the reduced receiver performance. However, the loss may be less than if the GRAKE+ users would be reallocated to RAKE receivers, as described above. The price paid for the improvement is that the load must be measured after GRAKE+ processing.

iii) Applying GRAKE+ Per Cell Followed by Simple Combining of Cells

One alternative is to, for all GRAKE+ users or for the limiting GRAKE+ users, as the ones targeted in the two preceding paragraphs, apply GRAKE+ per cell instead of over more than one cell, with which a user is in softer handover. This is achieved by applying GRAKE+ reception and combining of fingers belonging to one cell at a time. This procedure is then repeated for all cells in which the user is softer handover and is followed by a simple combination, for example MRC (Maximal-Ratio Combining) or soft value summation, of the received signals from the respective cells.

iv) Modification of Softer Handover Thresholds for GRAKE+ Users

The thresholds for entering softer handover may be increased for GRAKE+ users in order to reduce the number of terminals in softer handover and hence reduce the probability of an unfavorable load coupling effect. This would, however, clearly reduce the softer handover gain.

v) Blocking of Softer Handover for Limiting GRAKE+ Users

A GRAKE+ user UE may be stopped from entering softer handover if it is the limiting UE in its cell, i.e. experiences the highest load of the UEs in the cell. The price paid for the improvement is that the load must be measured after GRAKE+ processing.

vi) Blocking of GRAKE+ Users that are Predicted to Cause Limiting GRAKE+ Induced Uplink Load Coupling A GRAKE+ user may be stopped from entering softer handover if it would result in an unfavorable load coupling effect. This may be realized in the way that a user is stopped from entering softer handover if the user's load is a certain level above the load of the new target cell, to be added in softer handover. A flag could be set for UEs experiencing a certain load, e.g. the highest load in a set of cells. Then, if the flag is determined to be set when the UE approaches a softer handover situation, the UE is not allowed to enter softer handover. The price paid for the improvement is that the load must be measured after GRAKE+ processing.

vii) Dynamic Modification of Scheduling Thresholds in Case of Strong GRAKE+ Induced Uplink Load Coupling It can be noted that it is only in case a GRAKE+ user in softer handover becomes the worst UE in a target cell, and in case this UE experiences a significantly higher load than the other UEs in the target cell, that the load coupling problem introduces a significant limitation. Noting that such situations are easily detectable, from the computed loads of the users of the cells (28), it follows that special means can then be applied. It is e.g. possible to still allow some scheduling in such a cell, e.g. by dynamically increasing the stability and coverage thresholds for that cell. Such a dynamic increase can e.g. be computed as:

a) A fixed value, to be applied when the load of the limiting softer handover user is a pre-specified amount above the second worst user of the cell.
  b) A fixed value, to be applied when the load of the limiting softer handover user is a pre-specified amount above the mean load of the cell, excluding the limiting user.
  c) A fixed value, to be applied when the load of the limiting softer handover user is a pre-specified amount above the median load of the cell, excluding the limiting user.
  d) A percentage of the load difference, to be applied when the load of the limiting softer handover user is a pre-specified amount above the second worst user of the cell, and where the load difference is the difference between the load of the limiting softer handover user and the second worst user of the cell.
  e) A percentage of the load difference, to be applied when the load of the limiting softer handover user is a pre-specified amount above the mean load of the cell, and where the load difference is the difference between the load of the limiting softer handover user and the mean load of the cell.
  f) A percentage of the load difference, to be applied when the load of the limiting softer handover user is a pre-specified amount above the median load of the cell, and where the load difference is the difference between the load of the limiting softer handover user and the median load of the cell.

Combinations of the above alternatives are of course also possible, as are other alternative algorithms following the same ideas. It shall also be noted that while the above disclosed methods may be used for load calculation in order to increased cell capacity when advanced receivers such as GRAKE+ are used, it may still be possible to use the baseline GRAKE+ algorithm, i.e. over all cells in softer handover, for actual reception in the RBS. This would have the effect that some GRAKE+ gains are realized on the link level only, which may be seen as a coverage gain, but not on the system level, which means that there is no direct cell capacity gain.

In case a GRAKE+ user already is in softer handover when its experienced load after GRAKE+ processing increases and it becomes "bad" or even limiting in a cell, in order to avoid unwanted GRAKE+ induced load coupling the softer handover legs of said user can be removed or the user can remain in softer handover state but the leg(s) are, temporarily, removed from the GRAKE+ computation. Noting that it is not known from which cell the interference causing the limitation comes, the following solutions may be possible:

a) The loads of users in each cell are computed. In case the limiting GRAKE+ user in softer handover is larger than the second highest load in a cell by a predetermined threshold, a situation with unwanted GRAKE+ induced load coupling is detected.
  b) Any of the following actions are taken for said cell when unwanted GRAKE+ induced load coupling is detected:
    a. Removal of the softer handover leg of the limiting GRAKE+ user, thus going out of softer handover.
    b. Reallocation of said limiting GRAKE+ user to a RAKE receiver.
    c. Applying GRAKE+ per cell followed by simple combining of cells.

d. Dynamic modification of scheduling thresholds in said detected cell.

The actual load experienced by a UE may change when entering softer handover, due to effects of fast fading in both cells and since the power levels of the cells may therefore be radically different for the specific user.

Final Remarks

An exemplary advantage of the above embodiments is that they enable mitigation of a possible negative GRAKE+ induced load coupling between cells, with which a GRAKE+ user UE is in softer handover. The GRAKE+ induced load coupling could potentially cause load blocking in a target cell. Enabling mitigation of this load coupling can enhance the gains associated with an introduction of category 1 receivers, such as GRAKE+ receivers.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The invention has mainly been exemplified using GRAKE+ as an exemplary category 1 receiver However, as previously mentioned, the category 1 receiver could also be e.g. a chip equalizer; a frequency domain pre-equalizer or a frequency domain equalizer. It could further be a receiver involving interference cancelling methods, such as Successive Interference Cancelling (SIC), Parallel Interference Cancelling (PIC) or Multi-User Detection (MUD). The invention is generally defined by the following independent claims.

REFERENCES

[1] T. L. Fulghum, D. A. Cairns, C. Cozzo, Y.-P. E. Wang and G. E. Bottomley, "Adaptive generalized Rake reception in DS-CDMA systems, *Submitted to IEEE Trans. Wireless Commun.*, 2008.

[2] T. Wigren and P. Hellqvist, "Estimation of uplink WCDMA load in a single RBS", *Proc. IEEE VTC-2007 Fall*, Baltimore, Md., USA, Oct. 1-3, 2007.

[3] T. Wigren, "Soft uplink load estimation in WCDMA", *IEEE Trans Veh. Tech.*, March 2009.

[4] H. Holma and A. Toskala, WCDMA for UMTS—Radio Access for Third Generation Mobile Communications. Chichester, UK: Wiley, 2000, chapter 9.4.1, pages 211-213.

[5] Requirements for support of radio resource management (FDD), 3GPP TS 25.133, release 6 (v. 6.10.0), June 2005. Available: http://www.3gpp.org/ftp/Specs/html-info/25133.htm

[6] T. Wigren, "Method and arrangement for memory-efficient estimation of noise floor", Int Patent Application, PCT/SE2006/050347, Sep. 25, 2006. (P22298)

The invention claimed is:

1. A method in a radio base station (RBS) for handling load coupling in softer handover, the method comprising:
    receiving signals from a plurality of User Equipments (UEs) connected to the RBS, using a category 1 receiver, a category 1 receiver being an interference cancelling or interference suppressing receiver;
    determining the load experienced by the respective UEs;
    estimating the effect of load coupling, introduced by the category 1 receiver, in softer handover of at least one of the UEs connected to the RBS, load coupling implying a coupling of load between cells or cell sectors controlled by the same RBS; and,
    when the estimated effect of load coupling of a UE fulfills a predefined criterion, modifying at least one entity in the RBS, such that the effect of load coupling is reduced or avoided.

2. The method of claim 1, wherein said determining of the load experienced by the respective UEs comprises determining the Rise over Thermal (ROT) after processing in the category 1 receiver.

3. The method of claim 1, wherein said estimating of the effect of load coupling comprises determining a load dominance level of at least one of said UEs, wherein the determining of the load dominance level involves comparing the load experienced by the at least one UE to the loads experienced by the other respective UEs, or to one or more predefined thresholds, or both.

4. The method of claim 1, wherein the plurality of UEs are associated with a respective cell associated with the RBS.

5. The method of claim 3, wherein said estimating of the effect of load coupling further comprises estimating the consequences of a UE, having a certain load dominance level in a specific cell, entering a softer handover with at least one other cell.

6. The method of claim 1, wherein said modifying of at least one entity in the RBS comprises one or more of the following:
    reallocating a UE from the category 1 receiver to a category 2 receiver, a category 2 receiver being a receiver that does not scramble signal energies from different cells in softer handover;
    applying a category 1 receiver per cell instead of over more than one cell;
    changing a softer handover threshold;
    preventing a UE from entering or pursuing softer handover; and
    modifying scheduling thresholds.

7. The method of claim 6, wherein at least one entity is modified when a UE, for which the estimated effect of load coupling fulfills the predefined criterion, is considered for or involved in softer handover.

8. The method of claim 6, wherein the softer handover threshold is changed such that the probability of a UE being in softer handover is reduced.

9. An arrangement in a radio base station (RBS) adapted to handle load coupling in softer handover, the arrangement comprising:
    a receiving circuit comprising at least one category 1 receiver, adapted to receive signals from a plurality of User Equipments (UEs), a category 1 receiver being an interference cancelling or interference suppressing receiver;
    a determining circuit, adapted to determine the load experienced by the respective UEs;
    an estimating circuit, adapted to estimate the effect of load coupling, introduced by the at least one category 1 receiver, in softer handover of at least one of the UEs connected to the RBS, load coupling implying a coupling of load between cells or cell sectors controlled by the same RBS; and
    a control circuit, adapted to, when the estimated effect of load coupling of a UE fulfills a certain criterion, modify at least one entity in the RBS so that the effect of load coupling is reduced or avoided.

10. The arrangement of claim 9, wherein the determining circuit is adapted to determine the Rise over Thermal (RoT) after processing in the category 1 receiver.

11. The arrangement of claim 9, wherein the estimating circuit is adapted to determine a load dominance level of at least one of said UEs, wherein the determining of the load dominance level involves comparing the load experienced by the at least one UE to the loads experienced by the other respective UEs, or to one or more predefined thresholds, or both.

12. The arrangement of claim 11, wherein the estimating circuit is further adapted to estimate the consequences of a UE, being associated with a certain cell and having a certain load dominance level in said cell, entering a softer handover with at least one other cell.

13. The arrangement of claim 9, wherein the control circuit is adapted to modify at least one entity in the RBS such that at least one of the following is performed:
- a UE is reallocated from the category 1 receiver to a category 2 receiver, a category 2 receiver being a receiver that does not scramble signal energies from different cells in softer handover;
- a category 1 receiver is applied per cell instead of over more than one cell;
- the softer handover threshold is changed;
- a UE is prevented from entering or pursuing softer handover; and
- scheduling thresholds are modified.

14. The arrangement of claim 13, wherein the control circuit is adapted to modify at least one entity when a UE, for which the estimated effect of load coupling fulfills the predefined criterion, is considered for or involved in softer handover.

15. The arrangement of claim 13, wherein the control circuit is adapted to change the softer handover threshold so that the probability of a UE being in softer handover is reduced.

* * * * *